J. COPELAND.
Crimping Leather.
No. 483. Reissued Aug. 11, 1857.
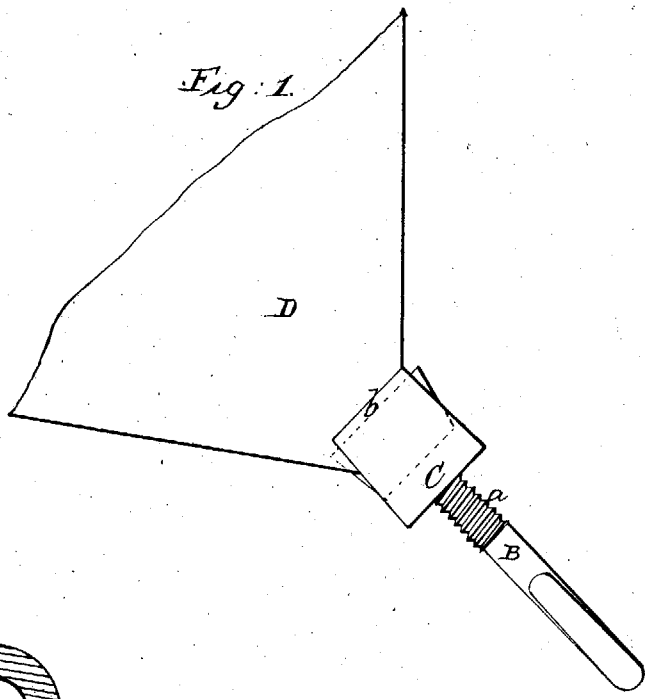
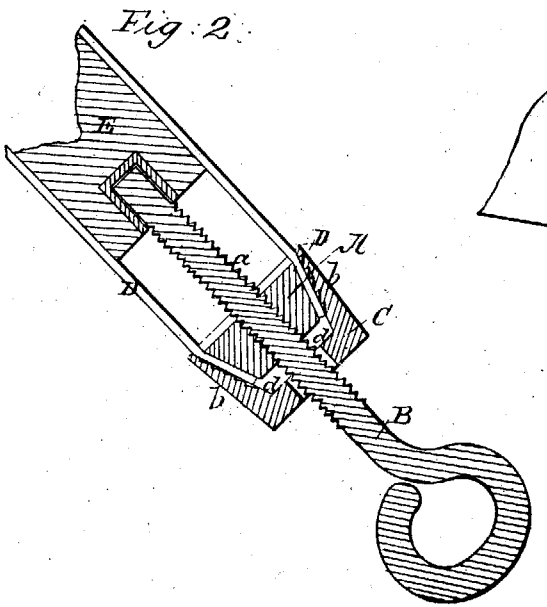

UNITED STATES PATENT OFFICE.

JOSIAH M. READ, OF WEYMOUTH, MASSACHUSETTS, ASSIGNEE, BY MESNE ASSIGNMENTS, OF JOSIAH COPELAND.

IMPROVEMENT IN BOOT-CRIMPS.

Specification forming part of Letters Patent No. 3,410, dated January 20, 1844; Reissue No. 183, dated August 11, 1857.

*To all whom it may concern:*

Be it known that JOSIAH COPELAND, of Weymouth, in the county of Norfolk and State of Massachusetts, did invent a certain new and useful Improvement in Boot-Crimps; and I do hereby declare that the following specification of the same, taken in connection with the accompanying drawings, fully sets forth the nature and principles thereof by which it may be distinguished from others of like character.

Of the drawings above mentioned, Figure 1 represents a side elevation of the improved boot-crimp as applied to the heel of a boot-form; and Fig. 2 is a central and longitudinal section thereof, taken in a plane at right angles to that upon which Fig. 1 is delineated.

A, Figs. 1, 2, denotes a block of metal, which in shape is the frustum of a quadrangular pyramid. This block has a female screw formed through its center, to which screw the small screw *a* upon the straining-shank B is adapted. The block A is situated within a metallic clasp, C, which is shaped as represented in the drawings, and has suitable teeth or indentations formed upon the inner sides of the portions *b b* of it, or those between which and the sides of the block A the corners of the leather D are gripped. It will be perceived that the sides *b b* of the clasp are not exactly at right angles with the bottom *d* thereof, but are slightly inclined outward in opposite directions to each other, as seen in Fig. 2.

The straining-shank B passes directly through a cylindrical hole, bored through the clasp C, the said clasp having no screw cut in it, but simply a hole, as described, for the shank B to extend through.

The sides of the block A may be scored or indented in order to cause them to firmly adhere to the leather during the straining or crimping operation, and the block A in its construction should for practical purposes be the frustum of a rectangular pyramid instead of having all its sides equal, or being, in other words, the frustum of a square pyramid—that is to say, the base of the pyramidal frustum should have two of its sides a very little longer than the other two, so as to make the block a little thicker from side to side in one direction than it is between its other opposite sides. This will enable the instrument to be readily adapted to leather of different thicknesses.

In order to use the crimp, the end of the straining screw or shank B is applied in the socket of the heel of the boot-form E in the usual manner, and the corners of the leather D D are next to be drawn over the opposite sides of the block A. The clasp C is then to be brought down upon the corners of the leather, so as to inclose them between it and the block, as seen in Fig. 2. This being completed, the straining-screw is to be turned in the required direction to cause the block A to recede from the boot-form E. The friction of the exterior sides of the corners of the leather upon the inner sides of the clasp will retain the clasp in its position upon the leather while the block A is drawn into the clasp, or until the leather is firmly gripped between it and the same. The revolutions of the straining-screw being continued will stretch or draw the leather upon the form in the usual manner.

The particular arrangement of the parts of this boot-crimp renders it much cheaper in its construction and more convenient in operation than the article invented and patented by Josiah M. Read on the 16th day of March, A. D. 1841, on which, as well as others, this may be considered a great improvement.

I am enabled to dispense with the wedge and stud used in the said Read's invention, thereby simplifying the instrument.

Generally speaking, it will not be advantageous to construct the block A with indentations on its sides, but to leave the same very nearly smooth, and to form the inner sides of the clasp C with teeth.

I do not claim strictly the combination, with a pyramidal frustum or block A, of another piece of metal forced down upon or over it by a screw or other contrivance separate from the main straining-screw, and for the purpose of confining the corners or edges of the leather between the said pieces of metal; nor do I claim the forcing of the two jaws or pieces of metal together by a screw or other contrivance separate from the main straining-screw; but That which I do claim consists—

In the manner above described of arranging the block A and clasps C so that the turning up of the straining-screw shall at the same time perform the double operation of confining the ends of the leather between the block and clasp and of stretching the leather over the boot-form, the whole being substantially as above specified

J. M. READ.

Witnesses.

THOS. R. ROACH,
P. E. TESCHEMACHER.